June 5, 1962 R. A. MULAC 3,037,799
UNIVERSAL BALL AND SOCKET JOINT
Filed Sept. 11, 1959

INVENTOR
RUDOLPH A. MULAC
BY
C. B. Hamilton
ATTORNEY

United States Patent Office 3,037,799
Patented June 5, 1962

3,037,799
UNIVERSAL BALL AND SOCKET JOINT
Rudolph A. Mulac, River Forest, Ill.
(3225 W. 26th St., Chicago 23, Ill.)
Filed Sept. 11, 1959, Ser. No. 839,371
5 Claims. (Cl. 285—282)

This invention pertains to a ball and socket joint and method of making, and more particularly to such a joint wherein the ball member is limited in rotation with respect to the socket member to prevent twisting and/or abraiding of electrical conductors passing therethrough.

An object of the invention is to provide an improved universal ball and socket having less parts than those now available.

Another object of the invention is to provide a low cost ball and socket of relatively few parts which may be economically manufactured and which is much easier to assemble so as to be produced by mass production methods.

Other objects and advantages of the invention will readily appear from the following description of a preferred embodiment thereof as exemplified in the accompanying drawings, wherein.

Figure 1:
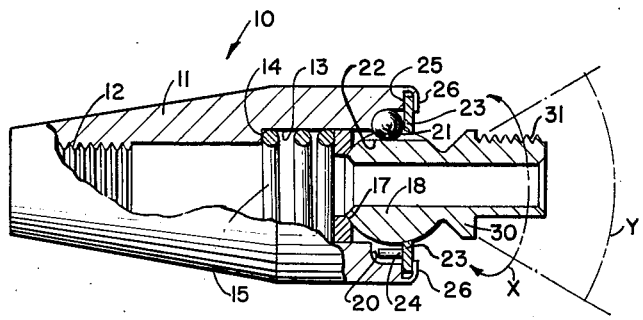
FIG. 1 is a front elevation of the assembled universal ball and socket joint shown partly in section.

Referring now to the drawing in which like reference numerals designate the same parts throughout the several views, the general reference numeral 10 indicates an electric ball and socket joint constructed in accordance with the present invention. Electrical conductors are adapted to be run through the longitudinal axis of this hollow ball and socket joint. Rotation about this longitudinal axis is indicated by dot-and-dash line X, and rotation about a transverse axis is designated by dot-and-dash line Y.

The ball and socket joint includes a hollow socket housing 11 having a lower or lefthand internally threaded cylindrical portion 12 for attachment to any part or device (not shown) and a larger cylindrical bore 13 having a shoulder 14. Mounted within the bore 13 is a coiled compressed spring 15 which is supported on the cylindrical shoulder 14.

Figure 2:
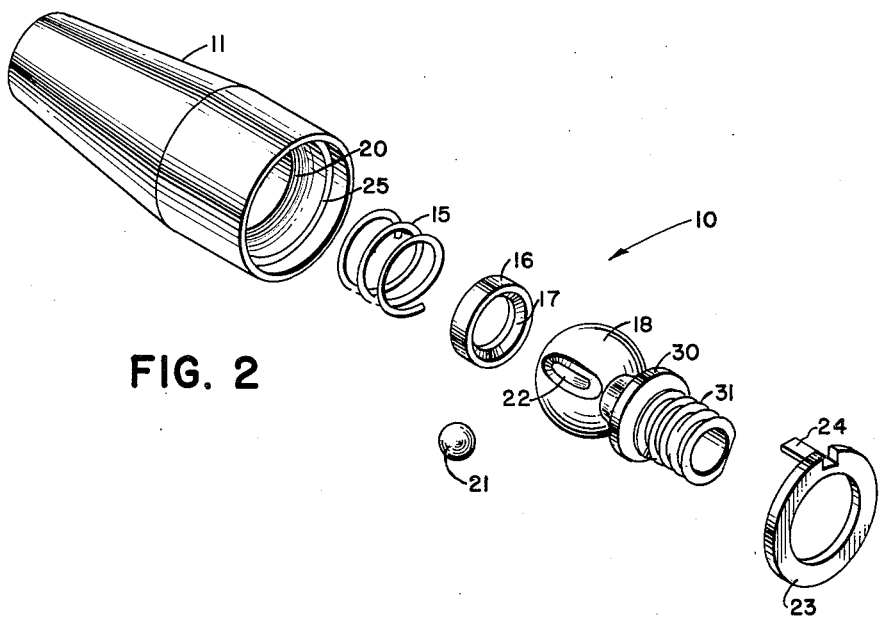
FIG. 2 is an exploded view of the parts of the ball and socket showing the order in which the parts are assembled.
Figure 3:
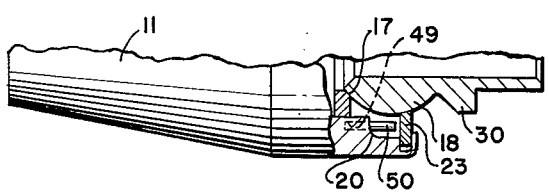
FIG. 3 is a fragmentary front elevation of another embodiment of the invention which is similar to that shown in FIG. 1.

A race washer 16 rests on top of the spring 15 and has an arcuate annular inner surface 17 for movably receiving a ball 18. The uppermost or righthand part of the housing 11 is provided with an annular recessed raceway 20 for receiving a ball bearing 21 which fits into an arcuate groove 22 of a predetermined length in ball 18. A friction washer 23 has a depending stop 24 and fits onto a shoulder portion 25 of the housing 11. After the parts are assembled as shown in FIGS. 2 and 3, then the upper end of socket housing 11 is swaged over at 26 to hold the compressed spring 15, race washer 16, ball 18, ball bearing 21 and washer 23 in the positions shown in FIG. 1.

The ball 18 is provided with an integral flange 30 and a threaded nipple 31 for attachment to any part or electrical device (not shown).

The assembly of the ball and socket is accomplished by holding the housing 11 in a vertical position whereupon the spring 15 is placed inside the socket housing to rest on the annular shoulder 14. The race washer 16 is then placed on top of the spring 15 and the ball 18 is positioned as shown in FIG. 1. The ball bearing 21 is then placed in raceway 20 so that this bearing projects into the groove 22 in the ball 18. Next, the washer 23 with depending stop 24 is placed to encircle the upper portion of ball 18. Pressure is then applied to force the washer 23 and the ball 18 downward so that the washer 23 rests on the shoulder 25 within the housing, whereupon the upper edge of housing 11 is swaged or staked over at 26 to hold the above parts in the position shown in FIG. 1.

The compressed spring 15 forces the race washer 16 and ball 18 outward whereby the upper or righthand portion of the ball is forced into frictional engagement with the washer 23 which is locked in position. Thus the ball 18 can be rotated clockwise or counter-clockwise as indicated by X about the longitudinal axis until integral depending stop 24 engages the ball bearing 21 to prevent any further movement in that particular direction. Since the ball and socket housing cannot be rotated more than 360° about the longitudinal axis relative to each other, this prevents twisting of any electrical conductors that may pass through this ball and socket joint. Once this ball and socket is assembled, it is fool proof since it cannot be taken apart outside the factory where it is assembled.

FIG. 3 discloses another embodiment of the invention which has the same construction as that shown in FIG. 1 except that the depending stop 24 is deleted from the washer 23 and is replaced by a projecting pin 50 driven into a hole 49 in the raceway 20 (FIG. 3). Hence, the ball 18 can be rotated clockwise or counter-clockwise until ball 18 engages the pin 50 to prevent any further rotation.

The ball 18 or socket housing 11 may also be rotated transversely relative to each other through a restricted arc as indicated by dot-and-dash line Y. This movement is restricted by the length of arcuate groove 22 in ball 18, which engages the movable ball bearing 21 held in position by locked washer 23.

It will now be observed that the compact joint made of very few parts is capable of other modifications and is to be limited only by the scope of the appended claims.

Having thus described the invention, what is claimed is:

1. A universal ball and socket joint comprising a one piece hollow housing having a shoulder for supporting a compressed spring, a race washer within the housing and resting on top of the compressed spring, a movable ball member having a groove of predetermined length and resting on the race washer, a ball bearing positioned in a raceway within the housing and projecting into the groove in the ball, and a washer having an integral depending stop extending into the raceway for engagement with the ball bearing, said washer being secured in locked position by swaging the upper end of the housing over a portion of the washer.

2. A ball and socket joint comprising a hollow socket housing having an internal recessed raceway, a ball member having an arcuate groove of predetermined length, a locking washer encircling an upper portion of the ball member and having an integral depending stop projecting into the recessed raceway, a ball bearing positioned in the recessed raceway within the housing and within the arcuate groove of the ball member for engaging the the depending stop to limit movement of the ball member, resilient means for forcing the ball member into engagement with the ball bearing and the encircling locking washer, and swaged over portions of the upper edge of the housing for engaging and holding the locking washer in a predetermined position within the upper part of the housing and in frictional engagement with the ball member.

3. A ball and socket joint comprising a hollow socket housing having a plurality of shoulders and a recessed raceway, a ball member having a restricting groove, a compressed spring supported on one of the shoulders within the housing, a race washer engaging the spring and having an inner arcuate surface for engaging a lower portion of the ball member, a ball bearing positioned within said recessed raceway and extending into and engaging the groove in the ball member, a locking washer supported on another shoulder of the housing and encircling an upper portion of the ball member for restricting upper movement thereof; said locking washer having a depending stop extending into the recessed raceway for engaging the ball bearing projecting partially into the ball member restricting groove to restrict angular movement of the ball member; and means for holding the locking washer with its stop in fixed position in the upper end of the housing to retain the spring, the race washer, the ball member, and the ball bearing in cooperative working relationship.

4. A ball and socket joint comprising a hollow socket housing having a circular groove; a ball member having an arcuate groove; a race washer for engaging the lower portion of the ball member; resilient means within the housing for forcing the race washer into engagement with the ball member; a ball bearing projecting into the said circular groove of the housing and into the said arcuate groove of the ball member to guide the movement of the ball member in a predetermined path; a ring element for encircling the upper portion of the ball member and having an integral depending stop extending into the said circular housing groove and engaging the ball bearing to limit the movement of the ball member; and tamper proof means integral with the socket housing for permanently locking the ring element and stop in a fixed position to retain the resilient means, race washer, ball bearing and ball member in cooperative working relationship within the housing.

5. A ball and socket joint comprising a hollow socket housing having internal seats and a raceway, a ball like member having a groove of predetermined length, a washer placed on one of the housing seats and encircling an upper part of the ball member and having an integral projecting stop extending into the raceway of the housing, a movable means positioned in the housing raceway and projecting into the groove of the ball like member for engaging the projecting stop to limit movement of the ball member, resilient means placed inside the housing on another of said seats for forcing the ball member into engagement with the encircling washer, and swaged over portions of the upper edge of the housing for holding the washer with its stop in a fixed position in the housing and retaining the ball member and the movable means in cooperative working relationship.

References Cited in the file of this patent
UNITED STATES PATENTS

| | | |
|---|---|---|
| 2,309,307 | Geiger | Jan. 26, 1943 |
| 2,635,906 | Graham et al. | Apr. 21, 1953 |
| 2,910,310 | Mulac | Oct. 7, 1959 |

FOREIGN PATENTS

| | | |
|---|---|---|
| 461,065 | Germany | Mar. 13, 1929 |